Sept. 1, 1936.  O. W. LIVINGSTON  2,053,156
SELECTOR RELAY SYSTEM
Filed Dec. 30, 1933
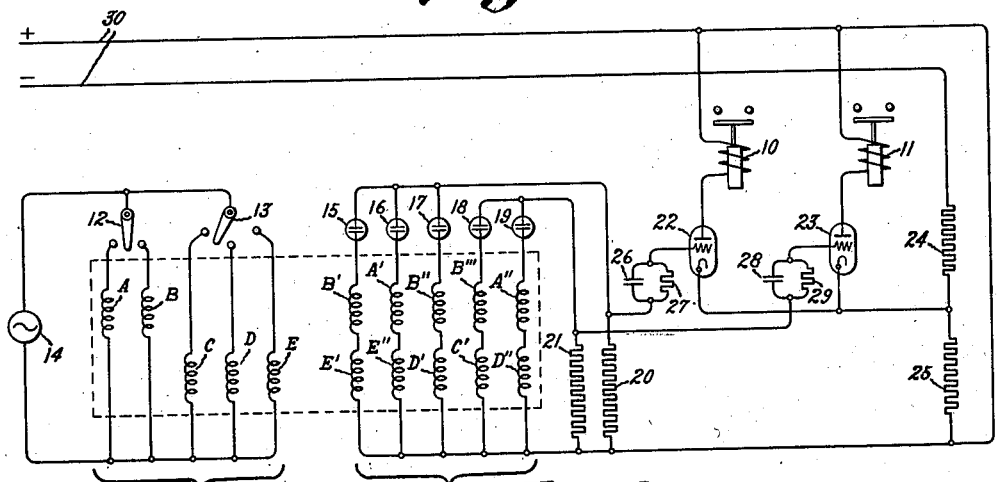
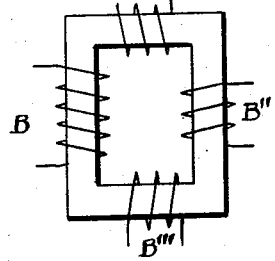
Inventor:
Orrin W. Livingston,
by Harry E. Dunham
His Attorney.

Patented Sept. 1, 1936

2,053,156

UNITED STATES PATENT OFFICE 2,053,156

SELECTOR RELAY SYSTEM

Orrin W. Livingston, Schenectady, N. Y., assignor to General Electric Company, a corporation of New York Application December 30, 1933, Serial No. 704,721

7 Claims. (Cl. 177—353)

My invention relates to selector relay systems, and more particularly to such systems for selectively energizing one of a plurality of electric translating devices or relays, in response to a plurality of combinations of positions of a plurality of selector switches.

It often happens in the control of industrial processes or operations, that it is desirable to initiate a particular one of a plurality of independent operations in response to the occurrence of a particular combination of preceding operations, and that different combinations of these preceding operations shall predetermine which of the succeeding operations is initiated. Heretofore, there have been proposed certain arrangements for accomplishing this result by the use of electro-mechanical relays, either electrically or mechanically interlocked. However, when any considerable number of primary or secondary operations are involved, such a system involves the use of an excessive number of such electro-mechanical relays with a corresponding increase in the complexity of the circuit, and the well known disadvantages inherent in the use of electro-mechanical relays.

It is an object of my invention, therefore, to provide an improved selector relay system for predetermining the initiation of any of a number of secondary operations in response to the occurrence of a predetermined combination of primary operations, which will overcome the above mentioned disadvantages of the arrangements of the prior art and which will be simple and reliable in operation.

It is another object of my invention to provide an improved selector relay system for initiating any of a number of secondary operations in response to the occurrence of a predetermined combination of primary operations, which will involve the use of a minimum number of electro-mechanical relays and other moving parts.

In accordance with my invention, there are provided a plurality of groups of electric translating devices, such as transformers, for example each group being connected to be energized from a source of current through a selector switch; that is, a switch for selectively energizing a single translating device of each group. There are also provided a plurality of electro-responsive devices, each of which is operative only upon the simultaneous energization of one of the electric translating devices from each of a plurality of the groups, the energization of each electro-responsive device being effected in response to the energization of a different combination of the electric translating devices. The electro-responsive devices may themselves produce the desired indication or control, or if desired, there may be provided also a plurality of relay means, each of which is operative in response to the operation of one or more of the electro-responsive devices; for example, the electro-responsive devices may constitute voltage break-down devices, such as glow tubes and a plurality of these may be connected in parallel to control the operation of a single electric valve relay.

For a better understanding of my invention, together with other and further objects thereof, reference is had to the following description taken in connection with the accompanying drawing, and its scope will be pointed out in the appended claims. Fig. 1 of the drawing schematically illustrates a selector relay system embodying my invention for selectively operating one of a pair of electric valve relays in response to different combinations of positions of two primary selector switches, and Fig. 2 represents schematically one of the transformers employed in the embodiment of Fig. 1.

Referring now more particularly to the drawing, there is illustrated a selector relay system for selectively operating either of a pair of relays 10 or 11 in accordance with predetermined combinations of positions of selector switches 12 and 13, each of which may have any desired number of positions, although I have illustrated the switch 12 as having two positions and the switch 13 as having three positions. The selector switch 12 is connected to selectively energize the transformer primary windings A and B from a source of alternating current 14. Associated with the transformer winding A are the secondary windings A' and A'', while the secondary windings B', B'' and B''' are associated with the transformer primary winding B. Similarly, the selector switch 13 controls the energization of the transformer primary windings C, D and E provided with secondary windings C', D', D'', E' and E'', respectively. As indicated in the drawing, the secondary windings are arranged in combinations, or pairs, each pair comprising a winding of the A—B transformers and a winding of the C—D—E transformers, and each pair comprising a different combination of the windings of these two groups of transformers.

In series with each pair, or combination, of secondary windings B'—E', A'—E'', etc., are connected the voltage responsive elements 15—19, inc., which may, for example, be glow tubes of a type well known in the art. These glow tubes are selected with characteristics such that the voltage induced in a single secondary winding is insufficient to cause the tube to break down and pass a current, while the voltage of two windings connected in series, when both are energized, is sufficient to effect the operation of the particular glow tube. These glow tubes may, of themselves, give the desired indication, or separately initiate the desired controlling operation in response to predetermined positions of the selector switches 12 and 13.

In certain instances, however, it may be desirable that the operation of a plurality of the electroresponsive devices 15–19, inc., may effect a single secondary operation. Such a system is disclosed in the drawing in which the group of glow tubes 15, 16 and 17 are connected in parallel through their associated transformer windings to a common resistance element 20, while the glow tubes 18 and 19 are similarly connected to energize a resistance element 21. The resistance elements 20 and 21 are included in the control circuits of the electric valves 22 and 23, respectively. The anode-cathode circuits of the electric valves 22 and 23 are energized with the potential across a portion 24 of a voltage divider 24—25 connected across the source of current 30. The anode-cathode circuits of the electric valves 22 and 23 include the operating coils of the relays 10 and 11 which may be connected to initiate any desired operation. The control circuits of the electric valves 22 and 23 include in addition to the resistance elements 20 and 21, respectively, the portion 25 of the voltage divider 24—25, which provides a source of negative bias and, in certain cases, it may be desirable to include also negative bias condensers and resistors 26—27 and 28—29, respectively.

Considering the operation of the above described apparatus, it will be assumed, for example, that the selector switch 12 is operated to the position to energize the primary winding B and selector switch 13 is operated to the position to energize the primary winding C. Under these conditions, the secondary windings B', B'' and B''' will be energized as well as the secondary winding C'. The only combination, or pair, of secondary windings, both of which are simultaneously energized, is thus the pair B'''—C'. Under these conditions, the glow tube 18 associated with these windings will break down to impress an alternating potential upon the resistance element 21. This alternating potential superimposed upon the bias appearing across the portion 25 of the voltage divider 24—25 is effective to render conductive the electric valve 23 and thus to energize the relay 11 to initiate the desired operation. The particular combinations of positions of the selector switches 12 and 13 which are effective to operate the relays 10 and 11 may be readily observed by referring to the following table:

|  | Switch 13 | | |
|---|---|---|---|
| Switch 12 | C | D | E |
| A |  | 11 | 10 |
| B | 11 | 10 | 10 |

Thus it will be seen that with the primary windings A—C energized, neither of the relays 10 or 11 is operated and that for other different combinations of positions of the selector switches 12 and 13, only one of the relays 10 and 11 is energized.

While my invention is illustrated as applied to a system including only two selector switches and two relays 10 and 11, together with their associated groups of secondary windings and glow tubes, it will be readily apparent to those skilled in the art that it is equally applicable to a system including any number of selector switches, and any number of groups of relays together with their associated groups of secondary windings.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. A selector relay system comprising a source of current, a plurality of selector switches, associated with each selector switch a group of voltage-producing electric translating devices connected to be selectively energized by such selector switch from said source, and a plurality of electroresponsive devices each connected to a different combination of series-connected translating devices from a plurality of said groups and operative in response to a voltage exceeding that of one of said translating devices.

2. A selector relay system comprising a source of current, a plurality of selector switches, associated with each selector switch a group of voltage-producing electric translating devices connected to be selectively energized by such selector switch from said source, and a plurality of electroresponsive devices operative in response to a voltage exceeding that of one of said translating devices, each of said electroresponsive devices being connected to a different combination of translating devices in series including an electric translating device from each of a plurality of said groups.

3. A selector relay system comprising a source of alternating current, a plurality of selector switches, associated with each said selector switch a group of transformers connected to be selectively energized by such selector switch, each of said transformers being provided with a primary winding adapted to be energized from said source through its associated switch and with at least one secondary winding, and a plurality of electroresponsive devices each connected in series with a different combination of a plurality of said secondary windings and operative only upon energization at a voltage exceeding the voltage of one of said secondary windings, each of said combinations including a secondary winding from each of a plurality of said groups.

4. A selector relay system comprising a source of current, a plurality of selector switches, associated with each selector switch a group of voltage-producing electric translating devices connected to be selectively energized by such associated selector switch from said source, and a plurality of voltage-responsive devices, each connected across a different combination of series-connected electric translating devices from a plurality of said groups, each of said combinations including an electric translating device from each of a plurality of said groups, each of said voltage-responsive devices being operative only upon energization at a voltage exceeding the voltage of one of its associated electric translating devices.

5. A selector relay system comprising a source of alternating current, a plurality of selector switches, associated with each selector switch a group of transformers connected to be selectively energized by such associated selector switch, each of said transformers being provided with a primary winding adapted to be energized from said source through its associated switch and with a secondary winding, and a plurality of glow tubes, each connected across a different combination of a plurality of said secondary windings connected in series and having such characteristics that it breaks down only upon the occurrence of a voltage thereacross exceeding the voltage of one of said secondary windings, each of said combinations including a secondary winding from each of a plurality of said groups.

6. A selector relay system comprising a plurality of selector switches, associated with each of said switches a group of transformer primary windings connected to be selectively energized by such associated selector switch, transformer secondary windings inductively related to said primary windings, said secondary windings being serially connected in different groups, each group of secondary windings comprising secondary windings associated with primary windings, from a plurality of said groups of primary windings, and electroresponsive means associated with each of said different groups of secondary windings and operative only upon energization at a voltage exceeding the voltage of one of said secondary windings.

7. A selector relay system comprising a source of current, a plurality of selector switches, associated with each selector switch a group of voltage-producing electric translating devices connected to be selectively energized by such associated selector switch from said source, a plurality of glow tubes, each connected to a different combination of series-connected translating devices from a plurality of said groups and operative in response to a voltage exceeding that of one of said translating devices, a plurality of electric valve relays, each provided with a control electrode and a control circuit, and a plurality of resistors equal in number to said valve relays, said glow tubes being divided into groups corresponding in number to said resistors and valve relays, the tubes in each such group together with the translating devices in series with them being paralleled and the parallel combination being connected in series with one of said resistors, each of said resistors being connected in a control circuit of one of said electric valves.

ORRIN W. LIVINGSTON.